(12) United States Patent
Albert et al.

(10) Patent No.: US 8,113,595 B1
(45) Date of Patent: Feb. 14, 2012

(54) ELECTRIC BOOSTER WITH HYDRAULIC TRANSMISSION

(75) Inventors: Timothy J. Albert, Niles, MI (US);
Kenneth Towers, Granger, IN (US);
Kevin Johnson, Granger, IN (US)

(73) Assignee: Robert Bosch GmbH, Stuttgart (DE)

( * ) Notice: Subject to any disclaimer, the term of this patent is extended or adjusted under 35 U.S.C. 154(b) by 605 days.

(21) Appl. No.: 12/261,105

(22) Filed: Oct. 30, 2008

(51) Int. Cl.
*B60T 8/44* (2006.01)

(52) U.S. Cl. ............... 303/114.1; 188/72.8; 188/157

(58) Field of Classification Search ........... 303/114.1, 303/3, 114.3, 20, 157, 158; 188/157, 158, 188/162, 72.8
See application file for complete search history.

(56) References Cited

U.S. PATENT DOCUMENTS

| | | | |
|---|---|---|---|
| 4,395,883 A | | 8/1983 | Melinat |
| 5,609,399 A | * | 3/1997 | Feigel et al. ............... 303/113.4 |
| 5,943,863 A | | 8/1999 | Jordan |
| 6,574,959 B2 | | 6/2003 | Fulks et al. |
| 6,758,041 B2 | | 7/2004 | Bishop et al. |
| 7,367,187 B2 | * | 5/2008 | Ikeda et al. ............... 60/545 |

FOREIGN PATENT DOCUMENTS

DE 4401524 8/1995

OTHER PUBLICATIONS

Partial European Search Report corresponding to European Patent Application No. 09174067, Mail Date Mar. 5, 2010 (5 pages).

* cited by examiner

*Primary Examiner* — Pamela Rodriguez
(74) *Attorney, Agent, or Firm* — Maginot, Moore & Beck

(57) ABSTRACT

An electric brake has a master cylinder (12) including pistons (22, 24) for rear and front brake circuits and an electric motor (50) for actuating the rear brake piston (22). A feedback circuit provides a signal indicative of the fluid pressure supplied to the rear brake circuit and is operable in response to driver commanded braking force (48) to supply fluid pressure to the rear wheel brake circuit. A mechanical coupling (44, 46) between the second piston and a brake pedal is responsive to driver applied brake pedal force to supply fluid pressure to the front wheel brake circuit. A fluid circuit (30, 82) utilizes the fluid pressure supplied to the rear wheel brake circuit to augment driver applied brake pedal force thereby supplying power boosted fluid pressure to the front wheel brake circuit.

11 Claims, 1 Drawing Sheet

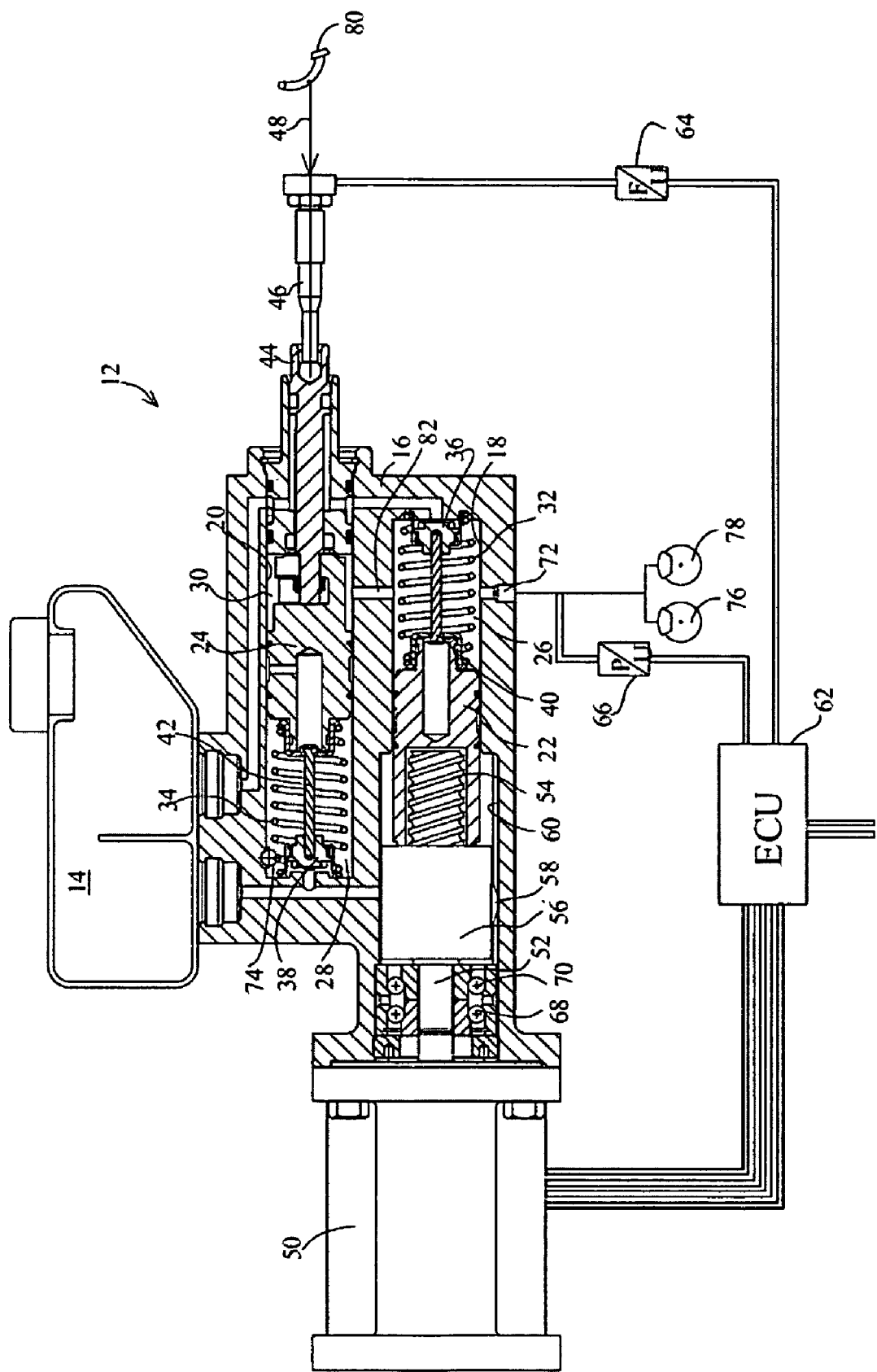

ELECTRIC BOOSTER WITH HYDRAULIC TRANSMISSION

BACKGROUND OF THE INVENTION

1. Field of the Invention

The present invention relates to vehicle braking systems and more particularly to an improved electric power brake.

2. Description of the Related Art

Vehicle braking systems have evolved from simple mechanical brakes to hydraulic brakes and then to power assisted hydraulic brakes. One very common power brake mechanism employs a housing intermediate an operator brake actuating pedal mechanism and a master cylinder which, when enabled, supplies fluid pressure to individual wheel brake cylinders or actuators. The housing includes a piston or diaphragm normally exposed on both sides to vehicle manifold vacuum. When the operator actuates the brake pedal, atmospheric pressure is admitted to one side of the piston supplying additional force to the master cylinder piston and enhanced brake line pressure to the individual wheel cylinders. Operator applied pedal force (without boost) is transmitted to the master cylinder through the boost mechanism if no vacuum is available. Vacuum boosters of this type are illustrated in numerous patents, for example, U.S. Pat. No. 5,943,863.

Many vehicles, for example, hybrid vehicles or those employing diesel engines, lack a vacuum source and may utilize a power steering pump or a separate dedicated pump as a hydraulic pressure source, or may employ a separate air compressor for air brakes. All of these systems rely on operation of the vehicle engine to augment operator brake pedal input force.

Several patented systems eliminate the dependence on manifold vacuum or other power source dependent on engine operation by substituting an electromechanical mechanism for above described vacuum booster. In U.S. Pat. No. 4,395,883, for example, brake pedal force is amplified by an electric motor acting through a gear set which converts, by way of a ball screw arrangement, rotary motion and torque from the motor into linear motion and force to energize the master cylinder piston. Operator input push rod forces are sensed, amplified and modulated by electronic means. The electric motor disengages from the gear set at rest or if there is an electrical failure, so that there is a manual mode of operation available when necessary. A solenoid is used to operate a power clutch to separate the power and no-power apply modes. Suitable controls are provided by force sensing means such as a piezoelectric crystal or some other suitable pressure transducer, and suitable circuitry including control logic in the nature of a microprocessor.

U.S. Pat. Nos. 6,574,959 B2 and 6,758,041 B2 disclose similar systems. The 6,574,959 patented arrangement employs a transmission system including a belt wrapped around pulleys to transfer power from a motor to a ball screw, and suggests belts, toothed belts, chain belts or gears and that the pulleys can be sprockets or the like. In the 6,758,041 patent, the ball screw assembly is operatively connected by pinion and a ball screw drive gears between the output shaft of the electric motor and the booster shaft for converting torque from the motor into axial force applied to the booster shaft. Brake pedal input force is measured by a piezoelectric or magneto-restrictive sensor. To increase the speed at which the booster shaft retracts along the axis, and to ensure that the booster shaft moves to a fully retracted position, the booster includes a retraction spring in the form of a torsion or wrapped spring operatively connected between the ball screw drive gear and the housing.

Each of these patented electric booster arrangements is disposed intermediate the brake pedal push rod and the master cylinder input piston rod just as in the case of the traditional vacuum booster. Each employs a rather complex mechanical coupling between the motor and master cylinder piston rod. Electric brakes employing electromagnets at individual wheel brake locations to force braking surfaces together have also been suggested.

It is desirable to simplify complicated drive mechanisms, e.g., by eliminating complex driving transmissions, solenoid operated clutches and the like while retaining independence of engine operation and a vehicle braking capability despite any boost power source failure.

SUMMARY OF THE INVENTION

The present invention provides a compact reliable power boost without depending on engine operation, or requiring the presence of specific engine components.

The invention comprises, in one form thereof, an electrically boosted vehicle brake system having a master cylinder, an operator brake pedal, and individual wheel brake actuators. There is a master cylinder housing having a generally cylindrical bore with a piston reciprocably disposed in the bore defining in conjunction therewith a variable volume chamber. An electromechanical arrangement is coupled to the piston and is operable in response to operator brake pedal force to urge the first piston in a direction to decrease the chamber volume and apply fluid pressure to certain ones of the wheel brake actuators. The electromechanical arrangement includes a reversible electric motor having an output shaft with a threaded portion extending into the bore and a nut threadedly received on the threaded portion. The nut is prevented from rotating about the shaft. The nut engages and moves the piston in a direction to decrease the chamber volume and apply power boosted fluid pressure to the certain ones of the wheel brake actuators in response to shaft rotation in a first sense and releases the piston allowing an increase in the chamber volume in response to shaft rotation in a second sense.

In another form, a master cylinder for use in a vehicle brake system having an operator brake pedal and individual wheel brake actuators includes a master cylinder housing with first and second generally cylindrical bores therein. A first piston is reciprocably disposed in the first bore defining in conjunction therewith a first variable volume chamber and a second piston is reciprocably disposed in the second bore defining in conjunction therewith second and third variable volume chambers. The first and second chambers are connected to a reservoir to receive fluid and maintain the fluid level in the brake system at a desired level and are connected respectively to rear and front wheel brake actuators to supply pressurized fluid to effect a brake application. An electromechanical arrangement is coupled to the first piston and is operable in response to operator brake pedal force to urge the first piston in a direction to decrease the first chamber volume and apply fluid pressure to the rear wheel brake actuators. There is a mechanical coupling between the second piston and the operator brake pedal which, in response to operator brake pedal force, urges the second piston in a direction to decrease the second chamber volume and apply fluid pressure to the front wheel brake actuators. A fluid coupling conduit interconnecting the first and third chambers applies fluid pressure from the first chamber to the second chamber to supplement operator brake pedal force by urging the second piston in a direction to decrease the second chamber volume and apply fluid pressure to the front wheel brake actuators.

An advantage of the present invention is that reliance on engine operation is eliminated.

BRIEF DESCRIPTION OF THE DRAWINGS

The drawing FIGURE is a partially schematic cross-sectional view of a hydraulic brake master cylinder with electrical boost.

DETAILED DESCRIPTION OF THE INVENTION

Referring now to the drawing, there is shown a portion of a vehicle brake system including a master cylinder 12 having a fluid reservoir 14 supported on a housing 16. Housing 16 includes generally cylindrical bores 18 and 20 respectively including a first piston 22 and a second piston 24 reciprocably disposed therein. Piston 22 in conjunction with bore 18 defines a variable volume chamber 26 while the opposing faces of piston 24 define two variable chambers 28 and 30 within bore 20. A return spring 32 within the chamber urges piston 22 leftward as viewed to maximize the volume of chamber 26. Similarly, return spring 34 urges piston 24 toward the right as viewed to maximize the volume of chamber 28 and minimize that of chamber 30. The master cylinder is shown in its quiescent state with poppet valves 36 and 38 held open to allow fluid from the reservoir to fill chambers 26 and 28 as necessary. These poppet valves are spring biased closed, but held open by their respective stems 40 and 42. The stems are released when the respective pistons move from the locations shown. A piston rod 44 and push rod 46 mechanically couple the piston 24 to a source of vehicle operator input brake force 48 such as the conventional foot pedal 80.

Master cylinder 12 includes a boosted pressure output port 72 leading from chamber 26 to a rear brake circuit for actuating the individual wheel disc and caliper brake assemblies 76 and 78. Similar brake assemblies for the front wheels (not shown) receive actuating fluid from chamber 28 outlet port 74 by way of a front brake circuit. Alternatively, drum brakes may be employed with disc front and drum rear brakes being one frequently encountered combination. Conduit 82 couples the boosted output of the rear braking circuit to the power boosting input chamber 30 of the front braking circuit.

A reversible servo motor 50 has a shaft 52 including a threaded portion 54 extending into the bore 18. Shaft 52 is suitably journalled as by bearings 68 and 70. A nut 56 is threadedly received on shaft portion 54 and has a rotation preventing key 58 engaging a longitudinally extending bore sidewall slot or keyway 60. Together, the nut and threaded shaft portion comprise a ball screw mechanism. The servo motor 50 receives inputs from an electronic control unit 62 which in turn receives inputs from a force to voltage transducer 64 and a pressure to voltage transducer 66.

In operation, a vehicle operator depresses foot pedal 80 supplying a force 48 by way of push rod 46 and piston rod 44 moving piston 24 against the bias of spring 34 allowing valve 38 to close and increasing the fluid pressure in chamber 28. This increased pressure is transmitted by way of port 74 to the front brake lines and the front wheel brake actuators thereby applying the front wheel brakes. No electrical boost is required for this to occur. The operator commanded brake force 64 is also sensed by any suitable means and converted to a magnitude indicative electrical signal by transducer 64. The sensing and conversion may be accomplished by a piezoelectric device, for example, as shown in U.S. Pat. No. 4,395,883.

The rear brake circuit pressure is sensed and converted to a signal indicative thereof by transducer 66 and these signals are compared in the electronic control unit 62 to determine if the rear wheel circuit is receiving the pressure required by the commanded braking force. Electronic control unit 62 is coupled to any suitable power source such as a vehicle battery. If the rear wheel circuit pressure is inadequate, the electronic control unit 62 enables the servo motor rotating the threaded shaft 54 in a direction to advance nut 56 of the ball screw unit to the right as viewed forcing piston against the bias of spring 32 thereby increasing the pressure in chamber 26 and the rear wheel braking force. If the sensed rear wheel circuit pressure is inadequate, the electronic control unit 62 enables the servo motor rotating the threaded shaft 54 in a direction to retract nut 56 of the ball screw unit back to the left as viewed allowing the bias of spring 32 to force the piston leftward thereby decreasing the pressure in chamber 26 and the rear wheel braking force. The bias of spring 32 maintains the piston 22 in contact with nut 56, however, other suitable coupling arrangements may be employed. The braking pressures achievable by the motor and ball screw drive exceed those the operator normally creates through the mechanical coupling of push rod 46 and piston rod 44. That is, without the conduit 82, the pressure in chamber 26 is substantially greater than the pressure in chamber 28 during braking. However, the conduit 82 supplies chamber 26 pressure to the chamber 30 and the right hand face of piston 24 augmenting the operator created mechanical force on that piston and increasing the chamber 28 pressure as desired.

Thus, while a preferred embodiment has been disclosed, numerous modifications will occur to those of ordinary skill in this art. Accordingly, the scope of the present invention is to be measured by the scope of the claims which follow.

What is claimed is:

1. An electrically boosted vehicle brake system having a master cylinder, an operator brake pedal, and individual wheel brake actuators, comprising:

a master cylinder housing;

a generally cylindrical bore in said housing;

a first piston reciprocably disposed in said bore defining in conjunction therewith a first variable volume chamber; and an electromechanical arrangement coupled to said first piston and operable in response to operator brake pedal force to urge said first piston in a direction to decrease said first chamber volume and apply fluid pressure to certain ones of the wheel brake actuators;

the electromechanical arrangement including a reversible electric motor having an output shaft with a threaded portion extending into the bore and a nut threadedly received on the threaded portion, an arrangement for preventing nut rotation about the shaft, the nut engaging and moving the first piston in a direction to decrease said first chamber volume and apply power boosted fluid pressure to the certain ones of the wheel brake actuators in response to shaft rotation in a first sense and releasing said first piston allowing an increase in said first chamber volume in response to shaft rotation in a second sense.

2. The electrically boosted vehicle brake system of claim 1, wherein the electromechanical arrangement further includes an electronic control unit, a first transducer providing a signal to the electronic control unit indicative of operator brake pedal force, and a second transducer providing a signal to the electronic control unit indicative of power boosted fluid pressure, the electronic control unit enabling the electric motor to increase power boosted fluid pressure as operator brake pedal force increases and to decrease power boosted fluid pressure as operator brake pedal force decreases.

3. The electrically boosted vehicle brake system of claim 1, wherein the arrangement for preventing nut rotation includes a slot extending longitudinally along the bore sidewall parallel to the bore axis and a nut supported key extending into the sidewall slot.

4. The electrically boosted vehicle brake system of claim 1, wherein the master cylinder housing further includes:
 a second bore having a second piston reciprocably disposed therein, the second piston being responsive to operator brake pedal force to apply fluid pressure to other wheel brake actuators different from said certain ones of the wheel brake actuators;
 and a fluid pathway for utilizing the power boosted fluid pressure from said first chamber to provide a power boost to said second piston.

5. The electrically boosted vehicle brake system of claim 1, wherein the master cylinder housing further includes a second bore having a second piston reciprocably disposed therein and defining in conjunction therewith second and third variable volume chambers, one on either side of the second piston, the second piston responsive to operator brake pedal force to decrease the volume of the second chamber and apply fluid pressure to other wheel brake actuators different from said certain ones of the wheel brake actuators.

6. The electrically boosted vehicle brake system of claim 5, wherein said housing includes a conduit coupling said first chamber and said third chamber whereby upon application of operator brake pedal force the fluid pressure applied to said certain ones of the wheel brake actuators is also applied to said second piston to augment the operator brake pedal force applied thereto.

7. A master cylinder for use in a vehicle brake system having an operator brake pedal and individual wheel brake actuators, comprising:
 a master cylinder housing;
 a first generally cylindrical bore in said housing;
 a first piston reciprocably disposed in said first bore defining in conjunction therewith a first variable volume chamber;
 a second generally cylindrical bore in said housing;
 a second piston reciprocably disposed in said second bore defining in conjunction therewith second and third variable volume chambers;
 said first and second chambers being connected to a reservoir to receive fluid and maintain the fluid level in the brake system at a desired level and being connected respectively to rear and front wheel brake actuators to supply pressurized fluid to effect a brake application;
 an electromechanical arrangement coupled to said first piston and operable in response to operator brake pedal force to urge said first piston in a direction to decrease said first chamber volume and apply fluid pressure to said rear wheel brake actuators;
 a mechanical coupling between said second piston and the operator brake pedal and operable in response to operator brake pedal force to urge said second piston in a direction to decrease said second chamber volume and apply fluid pressure to said front wheel brake actuators; and
 a fluid coupling conduit interconnecting said first and third chambers for applying fluid pressure from said first chamber to supplement operator brake pedal force urging said second piston in a direction to decrease said second chamber volume and apply fluid pressure to said front wheel brake actuators.

8. The master cylinder of claim 7, further comprising a first return spring disposed in said first bore for biasing said first piston in a direction to maximize the volume of said first variable volume chamber and a second return spring disposed in said second bore for biasing said second piston in a direction to maximize the volume of said second variable volume chamber and minimize the volume of said third variable volume chamber.

9. The master cylinder of claim 8, wherein the electromechanical arrangement comprises:
 a slot extending longitudinally along said first bore sidewall parallel to the bore axis;
 a reversible electric motor having an output shaft including a threaded portion extending into said first bore;
 a nut threadedly received on said threaded portion including a key extending into said sidewall slot for preventing nut rotation about said shaft, the nut engaging and moving said first piston in a direction to decrease said first chamber volume and apply fluid pressure to said rear wheel brake actuators in response to shaft rotation in a first sense and releasing said first piston allowing an increase in said first chamber volume in response to shaft rotation in a second sense.

10. The master cylinder of claim 7, wherein the electromechanical arrangement provides the only force creating fluid pressure for said rear wheel brake actuators.

11. The master cylinder of claim 7, wherein in the absence of electrical power, the mechanical coupling between said second piston and the operator brake pedal is operable in response to operator brake pedal force to apply fluid pressure to said front wheel brake actuators while said rear wheel brake actuators remain inoperative.

* * * * *